United States Patent Office 2,977,373
Patented Mar. 28, 1961

2,977,373

α:α-BIS-(CHLOROMETHYL)-β-PROPIOLACTONE AND PROCESS FOR ITS PRODUCTION

Reginald John William Reynolds and Edward Jervis Vickers, Manchester, England, assignors to Imperial Chemical Industries Limited, London, England, a corporation of Great Britain No Drawing. Original application Aug. 23, 1955, Ser. No. 530,200, now Patent No. 2,853,474, dated Sept. 23, 1958. Divided and this application Aug. 6, 1958, Ser. No. 753,431

Claims priority, application Great Britain Aug. 25, 1954

2 Claims. (Cl. 260—343.9)

This invention relates to a new lactone useful, inter alia, for the manufacture of polyesters and to its manufacture.

According to the invention there is provided α:α-bis-(chloromethyl)-β-propiolactone.

The α:α-bis-(chloromethyl)-β-propiolactone is a low-melting solid of M.P. 35–36° C. obtainable by decomposing salts of β:β':β''-trichloropivalic acid and then isolating the lactone, for example by stirring a neutral solution of the sodium salt in water in presence of a water-immiscible solvent such as benzene or chloroform, and then recoving the lactone from its solution in the water-immiscible solvent or by dry distillation of anhydrous salts of β:β':β''-trichloropivalic acid, when practically pure lactone is obtained as the distillate. Silver and lead salts of β:β':β'-trichloropivalic acid are particularly advantageous to use, in that the yields of α:α-bis-(chloromethyl)-β-propiolactone so obtained are practically quantitative.

Polyesters having the structural unit:

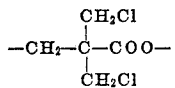

may be made by polymerising α:α-bis-(chloromethyl)-β-propiolactone, advantageously in presence of catalysts for the polymerisation.

The polyesters, including co-polyesters, are particularly useful for the manufacture of moulded articles, fibres and films. A particular feature of polymers containing in major amount the structural unit:

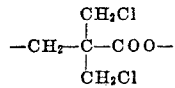

is their high melting point. Hitherto aliphatic polyesters have generally been characterised by comparatively low melting points.

α:α-bis-(chloromethyl)-β-propiolactone is also useful for the treatment of textiles, for example as a flame-proofing agent.

The invention is illustrated but not limited by the following examples in which the parts and percentages are by weight.

*Example 1*

The anhydrous, finely-powdered silver salt of β:β':β''-trichloropivalic acid is heated cautiously in an oil-jacketed distillation unit in a slow stream of nitrogen at a pressure of 0.2–0.3 mm. of mercury. A liquid begins to distill slowly when the jacket temperature reaches 105° C. and somewhat more rapidly when the temperature reaches 110° C. The liquid distillate soon begins to crystallise in the receiver. The jacket temperature is maintained between 110° C. and 115° C. until distillation slackens and is then raised slowly to 150° C. Very little further distillation occurs above a jacket temperature of 125° C. The solid distillate is collected and consists of practically pure α:α-bis-(chloromethyl)-β-propiolactone melting at 35°–36° C. The melting point is unchanged after recrystallisation from a mixture of n-hexane and benzene. Elementary analysis gives a figure of 42.4% for chloride content (theory 42.0%).

When the α:α-bis-(chloromethyl-β-propiolactone so obtained is heated above its melting point with a trace amount of pyridine, rapid polymerisation occurs to give a polymer which shows some signs of sintering at 250° C. but only melts completely at about 295° C.

*Example 2*

The anhydrous finely powdered lead salt of β:β':β''-trichloropivalic acid is heated cautiously in an oil-jacketed distillation unit in a slow stream of nitrogen at a pressure of 0.3–0.4 mm. of mercury. A liquid distillate, which crystallises in the cold receiver, begins to appear when the jacket temperature reaches about 165° C. The temperature is raised further to about 195° C. and is maintained at between 195–200° C. until distillation ceases. The solid distillate in the receiver is dissolved in dry thiophene-free benzene, the solution is filtered from a small amount of solid polymer and then concentrated by distillation under reduced pressure until the product starts to crystallise. n-Hexane is added with stirring to aid the further separation of product and the large crystals of α:α-bis-(chloromethyl)-β-propiolactone are then collected by filtration and dried. The melting point is 36° C.

*Example 3*

135 parts of α:α-bis-(chloromethyl)-β-propiolactone are heated to 40° C. out of contact with the moist atmosphere until completely molten and 1 part of a 13% solution of N:N:N':N' - tetramethylhexamethylenediamine in dry benzene is then added with stirring. The liquid mixture quickly becomes turbid owing to separation of polymer and after about 3 minutes rapidly silidifies with evolution of much heat. The product is heated to 50° C. and heating is continued for the further 5 hours at 50° C. The product is finally heated at 100° C. for one hour in a slow stream of nitrogen at a pressure of 0.1 mm. of mercury to remove benzene and trace amounts of any other volatile materials. The while solid polymer so obtained has a softening point of about 280° C.

*Example 4*

150 parts of α:α-bis-(chloromethyl)-β-propiolactone is heated to 40° C. out of contact with atmospheric moisture until completely molten and 0.1 part of finely powdered potassium hydroxide is then added with stirring. Heating and stirring are continued at 40° C. for about 15 minutes and then the mixture is heated to 50° C. The mixture soon becomes turbid owing to separation of polymer and within 2 hours is completely solid. Heating is continued without agitation for a further 4 hours at 50° C. and the product is finally heated at 100° C. in a slow stream of nitrogen at a pressure of 0.1 mm. of mercury to remove traces of volatile material. The product is a tough, white solid polymer which has a softening point of about 302° C. and gives a viscous melt from which may be spun filaments which are capable of being cold-drawn.

The present application is a division of our copending U.S. application, Serial No. 530,200, filed August 23, 1955, now U.S. Patent No. 2,853,474.

What we claim is:

1. $\alpha:\alpha$-Bis-(chloromethyl)-$\beta$-propiolactone.

2. Process for the manufacture of $\alpha:\alpha$-bis-(chloromethyl)-$\beta$-propiolactone which comprises dry distilling an anhydrous salt of $\beta:\beta':\beta''$-trichloropivalic acid whereby said salt is decomposed to form said lactone as the distillate, said salt being selected from the group consisting of the silver and lead salts of $\beta:\beta':\beta''$-trichloropivalic acid.

References Cited in the file of this patent

UNITED STATES PATENTS 2,518,662    Caldwell _____ Aug. 15, 1950